(12) United States Patent
Kuroiwa

(10) Patent No.: US 7,280,136 B2
(45) Date of Patent: Oct. 9, 2007

(54) ELECTRONIC CAMERA AND CONTROL INTEGRATED CIRCUIT FOR ELECTRONIC CAMERA

(75) Inventor: Toshihisa Kuroiwa, Miura (JP)

(73) Assignee: Nikon Corporation, Tokyo (JP)

( * ) Notice: Subject to any disclaimer, the term of this patent is extended or adjusted under 35 U.S.C. 154(b) by 770 days.

(21) Appl. No.: 10/195,423

(22) Filed: Jul. 16, 2002

(65) Prior Publication Data

US 2003/0020817 A1    Jan. 30, 2003

(30) Foreign Application Priority Data

Jul. 30, 2001    (JP)    .............................. 2001-230019

(51) Int. Cl.
*H04N 5/76* (2006.01)

(52) U.S. Cl. ................................. 348/231.99
(58) Field of Classification Search ............ 348/231.99
See application file for complete search history.

(56) References Cited

U.S. PATENT DOCUMENTS

| | | | |
|---|---|---|---|
| 5,604,534 A | * | 2/1997 | Hedges et al. .............. 348/144 |
| 5,999,211 A | * | 12/1999 | Hedges et al. .............. 348/144 |
| 2002/0046251 A1 | * | 4/2002 | Siegel ........................ 709/213 |
| 2002/0131765 A1 | * | 9/2002 | DeKeyser et al. ............. 386/70 |
| 2003/0113031 A1 | * | 6/2003 | Wal ............................ 382/260 |
| 2005/0286552 A1 | * | 12/2005 | Lisitsa et al. ............... 370/465 |

* cited by examiner

*Primary Examiner*—Vivek Srivastava
*Assistant Examiner*—James M. Hannett
(74) *Attorney, Agent, or Firm*—Oliff & Berridge, PLC

(57) ABSTRACT

An electronic camera of the present invention comprises an image pickup part, a microprocessor, and a multi-port memory that has a first port and a second port through which data can be independently accessed. The microprocessor writes the image data to the multi-port memory through the first port. The digital signal processor reads the image data from the multi-port memory through the second port, performs the software signal processing on the image data, and writes the processed data to the multi-port memory through the second port. The microprocessor reads the image data on which the software signal processing has been performed from the multi-port memory through the first port and records the read image data from the multi-port memory on a recording medium that stores data.

10 Claims, 3 Drawing Sheets

ELECTRONIC CAMERA AND CONTROL INTEGRATED CIRCUIT FOR ELECTRONIC CAMERA

CROSS REFERENCE TO RELATED APPLICATION

The disclosure of the following priority application is herein incorporated by reference: Japanese Patent Application No. 2001-230019, filed Jul. 30, 2001.

BACKGROUND OF THE INVENTION

1. Field of the Invention

The present invention relates to an electronic camera using a digital signal processor and a microprocessor so as to perform a signal processing and a recording processing of image data.

The present invention also relates to a control integrated circuit (IC) for use with an electronic camera incorporating the digital processor and the microprocessor.

2. Description of the Related Art

Recently, electronic cameras that are equipped with a microprocessor that controls a system and a signal processing engine (for example, a JPEG compression IC) as a hardware device are known.

Since the signal processing engine is structured as a hardware device, it is very advantageous in processing image data at high speed. However, since this signal processing engine processes a signal in compliance with a predetermined algorithm, it is not suitable for use such as flexibly changing the contents of a signal processing.

A software signal processing of a microprocessor is generally used for such use.

For example, for an image compression (for example, JPEG compression) according to a conventional recording format, a signal processing engine as a hardware device is used. On the other hand, for a manufacturer provided image compression (for example, loss-less compression for raw data), a software signal processing of a microprocessor is used.

However, in addition to the software signal processing on image data, the microprocessor should control the system of the electronic camera (for example, control of an image sensor and recording on a recording medium).

This increases the load of processing on the microprocessor, resulting in delaying the processings of the electronic camera.

SUMMARY OF THE INVENTION

Therefore, an object of the present invention is to provide an electronic camera and a control IC for the electronic camera in which a system control and a software signal processing are performed smoothly.

(1) A first aspect of the present invention is to provide an electronic camera which comprises: an image pickup part for picking up an image of an object and generates image data; a microprocessor for a system control; a digital signal processor for performing a software signal processing on the image data; and a multi-port memory having a first port and a second port through which data can be independently accessed.

The microprocessor writes the image data generated by the image pickup part to the multi-port memory through the first port. The digital signal processor reads the image data from the multi-port memory through the second port, performs the software signal processing on the image data, and writes the processed data to the multi-port memory through the second port. The microprocessor reads the image data on which the software signal processing has been performed from the multi-port memory through the first port and records the image data read from the multi-port memory on a recording medium for storing data.

This structure includes a microprocessor and a digital processor so that a software signal processing and a system control (in this example, an image recording) can be independently performed.

However, even with this structure that the software signal processing and the system control are independently performed, performing the both at high speed is still difficult. This is because simultaneously performing both processings causes data collision and data delay in the electronic camera, thereby deteriorating the total processing efficiency.

In this situation, it is generally attempted that a software signal processing and an image recording are pipelined. However, a progress in the image recording varies with time due to external factors of the recording medium and the like. It is therefore necessary to quickly adjust the timing at which the software signal processing disposed at an upstream stage of the pipeline structure is performed, in accordance with the progress in the image recording. Consequently, the pipeline structure results in complex and difficult timing adjustment.

To solve such a problem, the microprocessor and the digital signal processor according to the present invention exchange image data through a multi-port memory.

Thus, by writing image data to the multi-port memory, the microprocessor can entrust the software signal processing to the digital signal processor. In this case, the microprocessor can use the resultant idle time to read "processed image data" from the multi-port memory and record the data on the recording medium. Such parallel processings alleviate the load imposed to the microprocessor, and effectively and easily heighten the processing speed of the electronic camera.

In addition, the microprocessor can initiatively adjust the progress in the software signal processing with ease by controlling the amount of image data supplied through the multi-port memory. In this case, timing adjustment to the system control (in this example, the image recoding) and the software signal processing are facilitated, realizing smooth performing of both processings.

(2) A second aspect of the present invention is the electronic camera according to the first aspect of the present invention, wherein in accordance with a progress in the recording operation on the recording medium, the microprocessor controls data access to the multi-port memory so as to prevent the multi-port memory from overflowing.

For example, when a delay in the image recording causes image data before being recorded to stay in the multi-port memory, the microprocessor preferably delays (or stops) writing the image data to the multi-port memory so as to prevent it from overflowing. At this time, the software signal processing speed of the digital signal processor is appropriately slow due to a lack of image data to be processed. This results in improving a situation that data loss occurs because the software signal processing proceeds despite a delay in the image recording.

(3) A third aspect of the present invention is the electronic camera according to the first aspect of the present invention, wherein in accordance with a progress in the software signal processing of the digital signal processor, the microprocessor controls data access to the multi-port memory so as to shorten a waiting time for the software signal processing.

With this structure, the software signal processing can be completed at high speed with ease by shortening the waiting time of the digital processor.

(4) A fourth aspect of the present invention is the electronic camera according to the first aspect of the present invention, further comprising a signal processing engine for performing, with hardware, a signal processing on the image data generated by the image pickup part, the signal processing being different from the signal processing performed by the digital signal processor.

The microprocessor selectively uses the signal processing engine or the digital signal processor in conformity with a record format of the image data, processes the image data, and records the processed image data on the recording medium.

In this case, selecting the signal processing engine realizes a high-speed hardware signal processing. In contrast, selectively using the digital signal processor achieves a flexible software signal processing. As described above, selecting a suitable way of processing for a record format is achieved.

(5) A fifth aspect of the present invention is the electronic camera according to the fourth aspect of the present invention, wherein when the signal processing engine is selectively used for a signal processing of the image data, the digital signal processor takes charge of the software signal processing of a micro image of the image data.

In this case, the signal processing engine takes charge of the signal processing of image data while the digital signal processor takes charge of the software signal processing of a micro image. As a result, using both of the signal processing engine and the digital signal processor, the signal processings of the image data and micro image can be completed at high speed with ease.

(6) A sixth aspect of the present invention is the electronic camera according to the fourth aspect of the present invention, wherein when the signal processing engine is selectively used for the signal processing on the image data, the digital signal processor takes charge of the software signal processing on audio data associated with the image data.

In such a structure, when the signal processing engine takes charge of the signal processing of image data, the digital signal processor takes charge of the software signal processing of audio data.

Thus, using both of the signal processing engine and the digital signal processor, the signal processings of image data and audio data can be completed at high speed with ease.

(7) A seventh aspect of the present invention is a control integrated circuit incorporating a microprocessor, a digital signal processor, and a multi-port memory according to any of the forgoing first to sixth aspects of the present invention.

When the electronic camera is equipped with this control IC, the operations and effects of (1) to (6) can be easily accomplished.

BRIEF DESCRIPTION OF DRAWINGS

The nature, principle, and utility of the invention will become more apparent from the following detailed description when read in conjunction with the accompanying drawings in which like parts are designated by identical reference numbers, in which.

DESCRIPTION OF THE PREFERRED EMBODIMENT

Next, with reference to the accompanying drawings, an embodiment of the present invention will be described.

Structure of Electronic Camera

Figure 1:
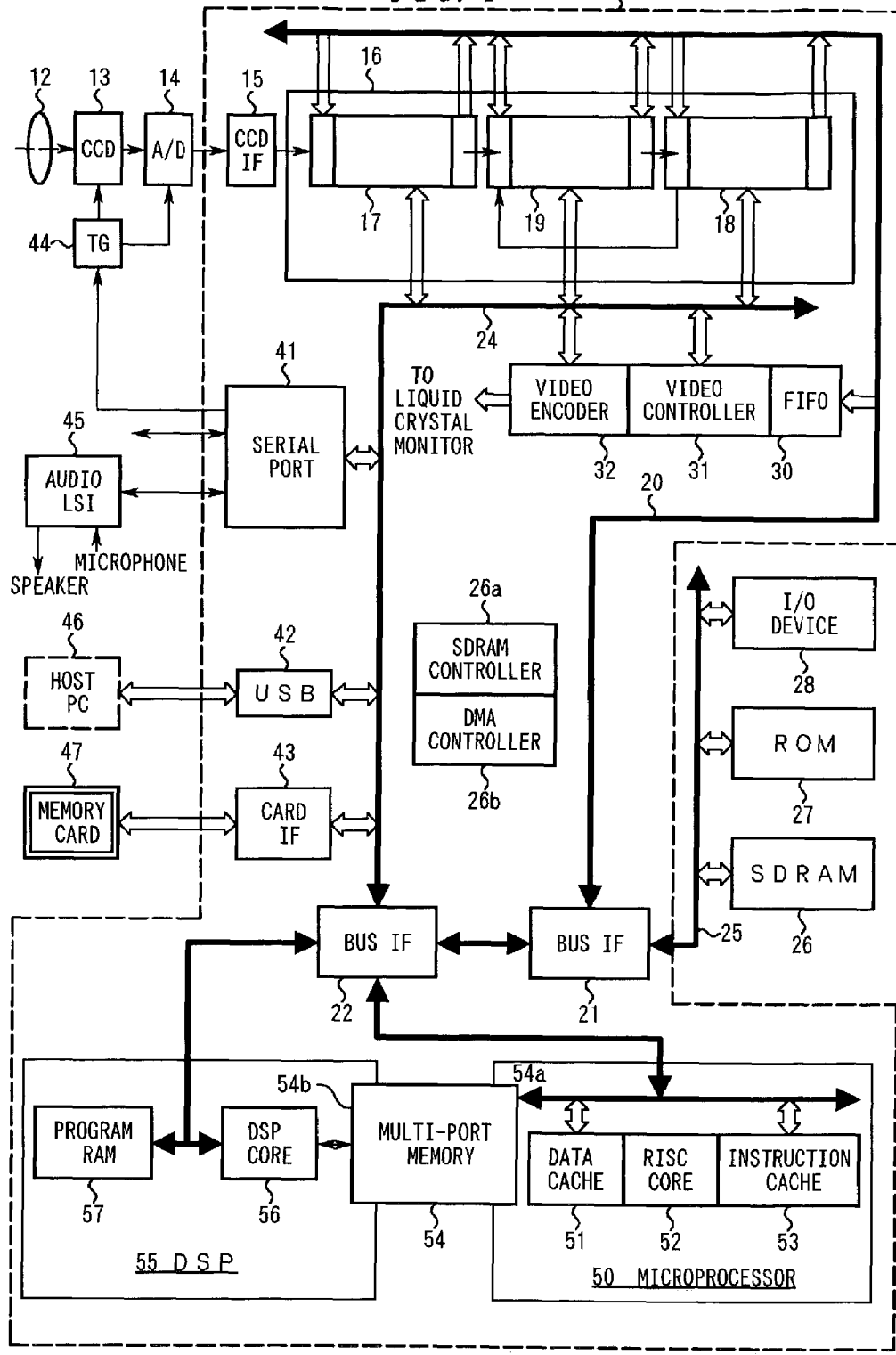
FIG. 1 is a schematic diagram showing the structure of an electronic camera 11 according to an embodiment of the present invention.

FIG. 1 is a schematic diagram showing the structure of an electronic camera 11 according to the embodiment of the present invention. In FIG. 1, an area surrounded by a dotted line represents a control IC 10. A signal processing system of the electronic camera 11 is composed of the control IC 10 and peripheral parts.

Next, the structure of the electronic camera 11 will be described in detail.

An image pickup lens 12 is mounted on the electronic camera 11. In an image space of the image pickup lens 12, an image pickup plane of an image sensor 13 is disposed. Image data that is output from the image sensor 13 is digitized through an A/D converting part 14. The digitized image data is input to a signal processing engine 16 that is a hardware device through an interface circuit 15.

The signal processing engine 16 is composed of an image processing block 17, a JPEG block 18, and a resolution converting block 19.

The image processing block 17 performs signal processings such as a defective pixel correction, an optical black-level correction, a gain correction, a white balance correction, a gamma correction, a color interpolation processing, a color coordinate transformation processing, and a spatial frequency filter processing.

The JPEG block 18 is a block that performs a compression processing and a decompression processing based on the JPEG (Joint Photographic Coding Experts Group) system.

The resolution converting block 19 is a block that converts an image size (the number of pixels in the vertical direction and horizontal direction). With the resolution converting block 19, a micro image displayed as a thumbnail (hereinafter this micro image is referred to as "thumbnail image"), a micro image displayed on a monitor, and so forth can be generated. In addition, with the resolution converting block 19, an electronic zoom function can be accomplished.

The blocks 17 to 19 of the signal processing engine 16 are connected to each other through dedicated signal lines of the signal processing engine 16.

The blocks 17 to 19 of the signal processing engine 16 can exchange signals thereamong through a picture bus 20. Each block of the signal processing engine 16 inputs and outputs image data through the picture bus 20. A video controller 31, a video encoder 32, and so forth are connected to the picture bus 20 through a FIFO (First-In First-Out buffer) 30. Image data that is input to the FIFO 30 through the picture bus 20 is processed through the video controller 31 and the video encoder 32 and output as a video signal for display to a liquid crystal monitor (not shown) disposed on a rear part of the electronic camera 11.

In addition, the picture bus 20 is connected to an external bus 25 through a bus interface 21 that performs a switching operation for a bus connection.

External parts are for example an SDRAM (Synchronous DRAM: Dynamic Random Access Memory) 26, a ROM (Read Only Memory) 27, and an I/O (Input/Output) device 28. To generate a control signal for the SDRAM 26, the control IC 10 is equipped with an SDRAM controller 26a. To directly transfer data to the SDRAM 26, the control IC 10 is equipped with a DMA (Direct Memory Access) controller 26b.

Image data is exchanged among the SDRAM 26, the signal processing engine 16, the FIFO 30, and so forth through the picture bus 20.

A serial port 41, a USB (Universal Serial bus) 42, and a card interface 43 are connected to a system bus 24.

A port terminal of the serial port 41 is disposed outside the control IC 10. The port terminal is connected to a timing generator 44 and an audio LSI 45. The timing generator 44 drives the image sensor 13. A terminal of the USB 42 is disposed outside the control IC 10. When necessary, the terminal of the USB 42 is connected to an external host computer 46 or the like. The card interface 43 reads and writes data from and to a memory card 47 that stores data.

A bus interface 22 is connected to a microprocessor 50 and a digital signal processor 55. The microprocessor 50 controls the system of the electronic camera 11. The microprocessor 50 is composed of a data cache 51, a RISC (Reduced Instruction Set Computer) core 52, and an instruction cache 53. The RISC core 52 is an instruction execution unit. The digital signal processor 55 is composed of a DSP core 56 (including a sum-of-product calculating unit) and a program RAM 57. The DSP core 56 is an instruction executing unit. The program RAM 57 stores a rewritable image processing program.

The microprocessor 50 can access an external device (such as the SDRAM 26) connected to the external bus 25 through the bus interfaces 21 and 22. Likewise, the microprocessor 50 can access a device (such as the USB 42 or the card interface 43) connected to the system bus 24. In addition, the microprocessor 50 can rewrite (change) a program stored in the program RAM 57 of the digital signal processor 55 through the bus interface 22. In addition, the bus interfaces 21 and 22 have a function for connecting a signal between the system bus 24 and the external bus 25. Such bus interfaces 21 and 22 are mainly controlled by the microprocessor 50.

A multi-port memory 54 is disposed between the microprocessor 50 and the digital signal processor 55. The microprocessor 50 is connected to a first port 54a of the multi-port memory 54. On the other hand, the digital signal processor 55 is connected to a second port 54b of the multi-port memory 54.

The multi-port memory 54 is for example a dual-port RAM.

Relation Between Invention and Embodiment

Next, the relation between the present invention and the embodiment thereof will be described. It should be noted that the relation just exemplifies one interpretation of the present invention as a reference, not aimlessly limits the present invention.

An image pickup part prescribed in the claim section corresponds to the image sensor 13, the A/D converting part 14, and the timing generator 44.

A microprocessor prescribed in the claim section corresponds to the microprocessor 50.

A digital signal processor prescribed in the claim section corresponds to the digital signal processor 55.

A multi-port memory prescribed in the claim section corresponds to the multi-port memory 54.

A signal processing engine prescribed in the claim section corresponds to the JPEG block 18 of the signal processing engine 16.

A control IC prescribed in the claim section corresponds to the control IC 10.

Operation in Loss-less Compression Model

Figure 2:
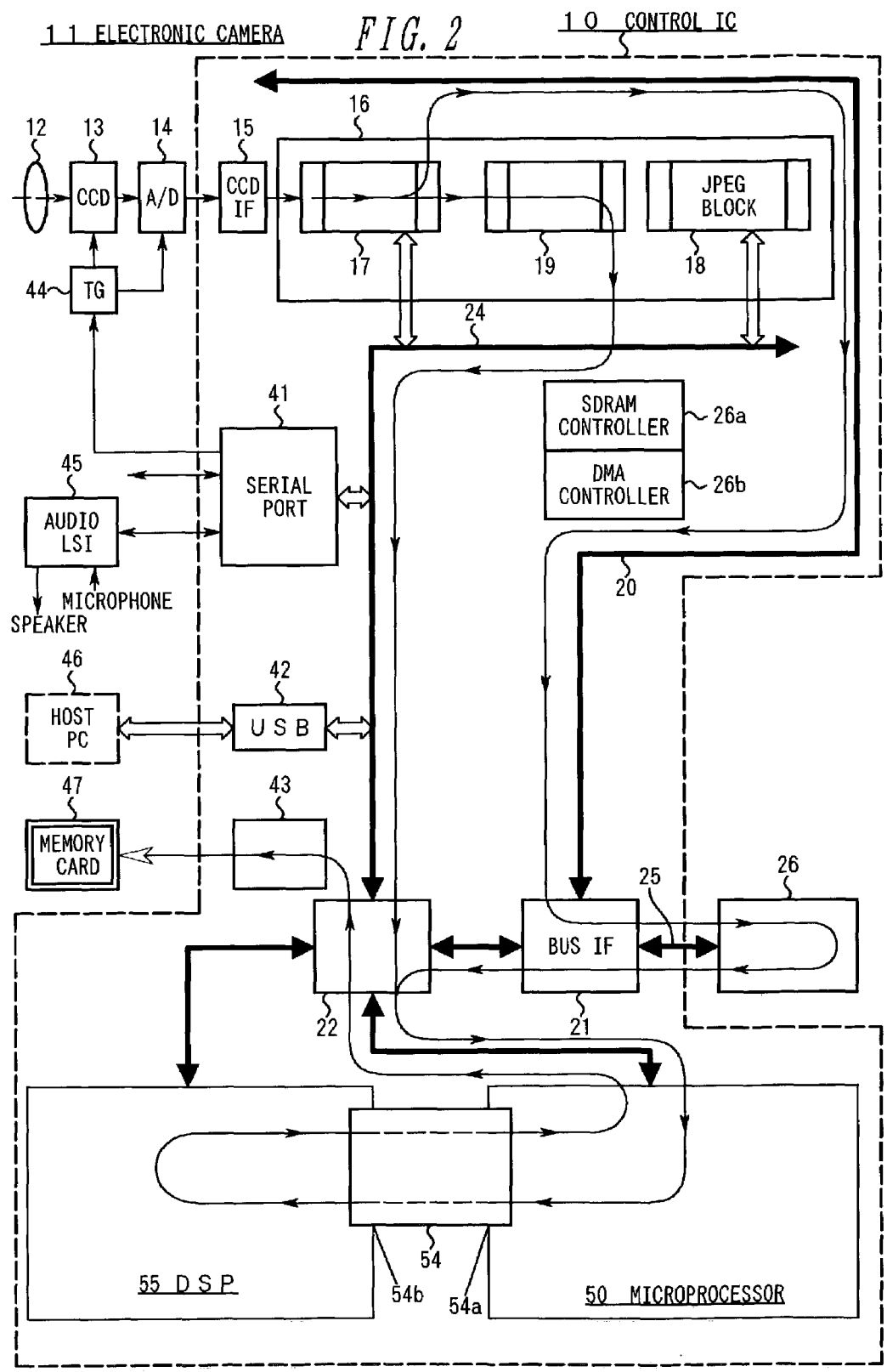
FIG. 2 is a schematic diagram showing a data flow in a loss-less compression mode.

FIG. 2 is a schematic diagram showing a data flow in the loss-less compression mode.

Next, with reference to FIG. 2, the operation in the loss-less compression mode will be described.

First of all, the user operates an operation button (not shown) of the electronic camera 11 so as to select the loss-less compression mode.

After the loss-less compression mode has been selected, the microprocessor 50 causes the digital signal processor 55 to execute a program for the loss-less compression mode.

In addition, the microprocessor 50 causes the bus interfaces 21 and 22 to select a signal connection as shown in FIG. 2. Moreover, the microprocessor 50 causes the image processing block 17 and so forth to operate in the loss-less compression mode.

After such a sequence of setting processings has been completed, when a release button (not shown) of the electronic camera 11 is pressed, the microprocessor 50 drives the image sensor 13 through the timing generator 44 and reads image data from the image sensor 13.

The image data that has been read is digitized through the A/D converting part 14 and the interface circuit 15 and then input to the image processing block 17.

After the image processing block 17 performs image processings (for example, the defective pixel correction and the optical black-level correction) of the image data in the loss-less compression mode, the image processing block 17 successively outputs the resultant image data to the picture bus 20.

The image data on the picture bus 20 is successively output to the external bus 25 through the bus interface 21. The DMA controller 26b successively records the image data that is output to the external bus 25 on the SDRAM 26.

On the other hand, the resolution converting block 19 captures image data from the image processing block 17, successively converts the resolution thereof, and generates a micro image (a thumbnail image).

In this case, the image data that is recorded on the SDRAM 26 may be different from data that is input to the resolution converting block 19. For example, CCD raw data is recorded on the SDRAM 26, whereas an RGB image or a YCbCr image is input to the resolution converting block 19.

The resolution converting block 19 outputs the generated micro image to the system bus 24.

The microprocessor 50 captures the micro image through the system bus 24 and writes the captured micro image to the multi-port memory 54 through the first port 54a.

The micro image may be transferred to the multi-port memory 54 by the DMA controller 26b. In this case, the microprocessor 50 causes the DMA controller 26b to transfer the micro image to the multi-port memory 54.

The digital signal processor 55 successively reads a micro image from the multi-port memory 54 through the second port 54b and performs the JPEG compression (software compression) on the micro image. The digital signal processor 55 writes the generated compressed data to the multi-port memory 54 through the second port 54b.

While performing the JPEG compression for the micro image, the microprocessor 50 waits until it receives a record permission from the memory card 47. When receiving the record permission from the memory card 47, the microprocessor 50 reads the compressed data of the micro image from the multi-port memory 54 and transfers it to the memory card 47 through the card interface 43. The memory card 47 records the compressed data of the micro image received from the macro processor 50.

In this case, the compressed data of the micro image may be transferred from the multi-port memory 54 to the memory card 47 by the DMA transfer.

In such a manner, the JPEG compression (software compression) and the recording processing of the micro image are repeatedly performed in parallel. As a result, an image file having a file header containing a micro image is newly created in the memory card 47.

After the processing of the micro image has been completed, the microprocessor 50 successively reads image data from the SDRAM 26 through the bus interfaces 21 and 22. The microprocessor 50 successively writes the image data to the multi-port memory 54 through the first port 54a (this operation may be performed by the DMA transfer).

The digital signal processor 55 successively reads image data from the multi-port memory 54 through the second port 54b and performs the loss-less compression (software compression) on the image data. The digital signal processor 55 writes the compressed data on which the loss-less compression has been performed to the multi-port memory 54 through the second port 54b (this operation may be performed by the DMA transfer).

While performing the loss-less compression, the microprocessor 50 waits until it receives a record permission from the memory card 47. When receiving the record permission, the microprocessor 50 reads the compressed data from the multi-port memory 54 and successively records the compressed data on an image data area of the image file that has been created and stored in the memory card 47.

In such a manner, the loss-less compression and the recording of image data are repeatedly performed in parallel. As a result, an image file in the loss-less compression mode is created in the memory card 47.

Operation in JPEG Compression Model

Figure 3:
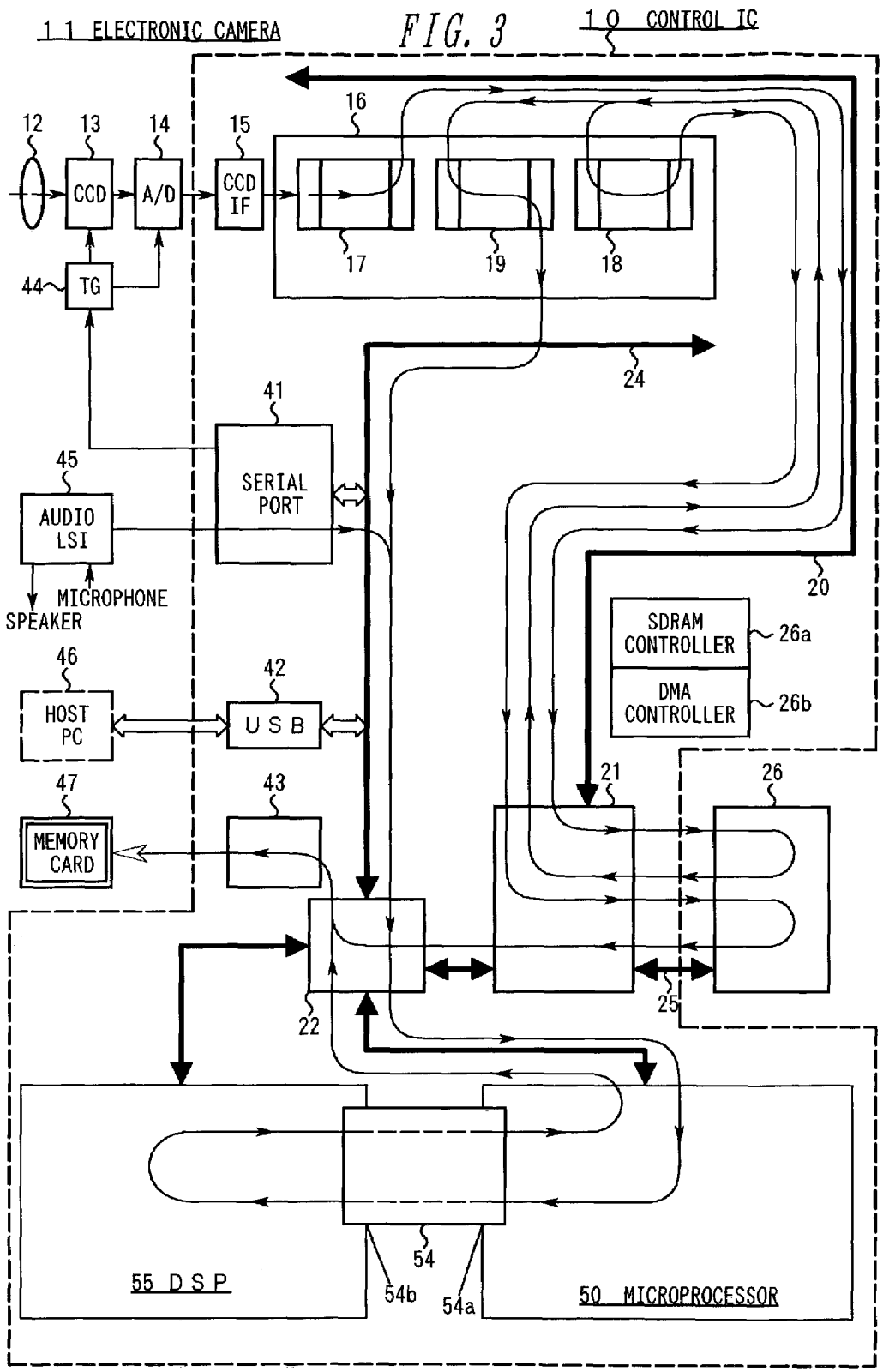
FIG. 3 is a schematic diagram showing a data flow in a JPEG compression mode.

FIG. 3 shows a data flow in the JPEG compression mode.

Next, with reference to FIG. 3, the operation in the JPEG compression mode will be described.

First of all, the user operates the operation button (not shown) of the electronic camera 11 so as to select the JPEG compression mode.

After the JPEG compression mode has been selected, the microprocessor 50 causes the digital signal processor 55 to execute a program for the JPEG compression mode.

In addition, the microprocessor 50 causes the bus interfaces 21 and 22 to select a signal connection as shown in FIG. 3. Moreover, the microprocessor 50 causes the image processing block 17 and so forth to operate in the JPEG compression mode.

After such a sequence of setting processings has been completed, when the release button (not shown) of the electronic camera 11 is pressed, the microprocessor 50 drives the image sensor 13 through the timing generator 44 and reads image data from the image sensor 13.

The image read data is digitized through the A/D converting part 14 and the interface circuit 15 and then input to the image processing block 17.

The image processing block 17 performs image processings (for example, the defective pixel correction, the optical black-level correction, the gain correction, the white balance adjustment, the gamma correction, the color interpolation processing, the color interpolation processing, the color coordinate transformation processing, and the spatial frequency filter processing) of the image data in the JPEG compression mode and then successively outputs the processed image data to the picture bus 20.

The image data on the picture bus is successively output to the external bus 25 through the bus interfaces 21 and 22. The DMA controller 26b temporarily records the image data that is output to the external bus 25 on the SDRAM 26.

While the DMA controller 26b is temporarily recording the image data on the SDRAM 26, the DMA controller 26b successively transfers the image data recorded on the SDRAM 26 to an image buffer of the JPEG block 18 by a predetermined amount at a time.

The JPEG block 18 successively reads the image data from the image buffer by a minimum unit of processing at a time and performs a hardware JPEG compression on the image data that has been read.

The JPEG block 18 stores the generated compressed data to an code buffer of the JPEG block 18. The DMA controller 26b transfers the compressed data stored in the code buffer to the SDRAM 26 using an idle time of the picture bus 20. The SDRAM 26 records the compressed data transferred by the DMA controller 26b.

While the JPEG block 18 is in operation, the resolution converting block 19 successively captures image data from the picture bus 20 and generates a micro image (in this example, a thumbnail image). The resolution converting block 19 outputs the generated micro image to the system bus 24.

The microprocessor 50 captures the micro image through the bus interface 22 and writes the micro image to the multi-port memory 54 through the first port 54a (this operation may be performed by the DMA transfer).

While the digital signal processor 55 is reading a micro image from the multi-port memory 54 through the second port 54b, the digital signal processor 55 performs a JPEG compression (a software compression) on the micro image. The digital signal processor 55 writes the generated compressed data to the multi-port memory 54 through the second port 54b.

On the other hand, while performing the compression processing on the micro image, the microprocessor 50 waits until it receives a record permission from the memory card 47. When receiving the record permission from the memory card 47, the microprocessor 50 reads compressed data from the multi-port memory 54 and transfers the compressed data to the memory card 47 through the card interface 43. The memory card 47 records the compressed data transferred through the card interface 43. (The transfer operation may be performed by the DMA transfer.)

In such a manner, the compression processing (software compression) and the recording processing of a micro image are repeatedly performed in parallel. An image file having a file header containing a micro image is newly created in the memory card 47.

In the forgoing description, an output signal of the image processing block 17 is temporarily recorded on the SDRAM 26. However, when a dedicated data path is disposed for each block, an output signal of the image processing block 17 can be supplied to the resolution converting block 19 and the JPEG block 18.

After the processing of a micro image has been completed, the microprocessor 50 obtains digital audio data from the audio LSI 45 through the bus interface 22.

The microprocessor 50 writes the audio data to the multi-port memory 54 through the first port 54a.

While the digital signal processor 55 is reading the audio data from the multi-port memory 54, the digital signal processor 55 performs a software compression on the audio data. The digital signal processor 55 writes the compressed data of the audio data to the multi-port memory 54 through the second port 54b.

On the other hand, while the microprocessor 50 is performing the compression processing of the audio data, the microprocessor 50 waits until it receives a record permission from the memory card 47. When receiving the record permission from the memory card 47, the microprocessor 50 reads the compressed data of the audio data from the multi-port memory 54 through the first port 54a and records the compressed data on an audio data area of the image file that has been created in the memory card 47.

When the audio LSI 45 cannot store digital audio data that has been converted from analog audio data, the digital signal processor 55 can compress and record audio data before or while the digital signal processor 55 performs (is performing) the processing of the micro image.

After the microprocessor 50 has completed the processings of the micro image and the audio data, the microprocessor 50 successively reads the compressed data of the image data from the SDRAM 26 through the bus interfaces 21 and 22 and successively records the compressed data on an image data area of the image file that has been created in the memory card 47 (this operation may be performed by the DMA transfer).

In such a manner, the hardware compression on image data is performed in parallel with the software processing of a micro image and the software processing of audio data.

With the forgoing operation, an image file in the JPEG compression mode is created in the memory card 47.

Features in Operation of Embodiment

Next, features of operations of the embodiment of the present invention will be described.

(A) According to the embodiment of the present invention, the microprocessor 50 and the digital signal processor 55 exchange data through the multi-port memory 54.

As a result, only by writing image data to the multi-port memory 54, the microprocessor 50 can entrust software signal processings (in this example, various compression processings) to the digital signal processor 55. Using the resultant idle time, the microprocessor 50 can perform the recording processing of the compressed data. As a result, the load imposed to the microprocessor 50 alleviates. Consequently, the processing of the electronic camera 11 can speed up.

(B) When the recording operation on the memory card 47 delays, compressed data that has not been recorded stays in the multi-port memory 54. In this case, the microprocessor 50 delays (stops) the write operation on image data to the multi-port memory 54 so as to prevent it from overflowing.

As a result, the software signal processing of digital signal processor 55 delays due to a lack of image data to be processed. This simple operation realizes precise adjustment of the timings at which the software signal processing and the image recording processing are performed.

(C) As image data stored in the multi-port memory 54 is compressed with software, the free space of the multi-port memory 54 gradually increases due to the data size difference between before and after the compression. By monitoring the variation in the free space of the multi-port memory 54, the microprocessor 50 can know the progress in the software signal processing. The microprocessor 50 properly writes image data to the multi-port memory 54 to prevent the free space from becoming large. As a result, the waiting time for the software compression can be effectively decreased.

(D) According to an embodiment of the present invention, besides the digital signal processor 55, the JPEG block 18 as a hardware device is provided. In the JPEG compression mode, using the JPEG block 18, the JPEG compression on image data is performed with hardware. In contrast, in the loss-less compression mode, using the digital signal processor 55, the loss-less compression uniquely provided by the manufacturer is performed with software.

(E) According to the embodiment of the present invention, when the signal processing engine 16 is selectively used for the compression processing of image data, the digital signal processor 55 takes charge of the software compression of a micro image. This way of processing enables the processing of image data and micro image data to be completed at high speed.

(F) According to the embodiment of the present invention, when the signal processing engine 16 is selectively used for a signal processing of image data, the digital signal processor 55 also takes charge of a software signal processing of audio data. This way of processing enables the processing of image data and audio data to be completed at higher speed.

Supplementary Description of Embodiment

According to the forgoing embodiment, the digital signal processor 55 selectively performs a compression processing as a software processing. In other words, with the digital signal processor 55, various types of compression processings can be performed with software.

However, software signal processings according to the present invention are not limited to the forgoing compression processings. For example, with the digital signal processor 55, an image processing of image data can be properly performed as a software signal processing.

In addition, according to the forgoing embodiment, in the JPEG compression mode, audio data is compressed and recorded. However, it should be noted that the present invention is not limited to audio data in the JPEG compression mode. In other words, in the JPEG compression mode, the compressing and recording processings of audio data may be omitted.

According to the forgoing embodiment, a motion JPEG image pickup mode may be added. In the motion JPEG image pickup mode, the recording of a micro image (a thumbnail image) can be omitted. Thus, the motion JPEG compression (hardware compression) on image data by the JPEG block 18 and the compression (software compression) on audio data by the digital signal processor 55 can be performed in parallel nearly on real time basis.

In the forgoing embodiment, a mode in which audio data is after-recorded on a pre-recorded image file may be added as an after-record mode. In the after-record mode, the digital signal processor 55 can dedicatedly perform a compression processing of audio data nearly on real time basis.

The invention is not limited to the above embodiments and various modifications may be made without departing from the spirit and scope of the invention. Any improvement may be made in part or all of the components.

What is claimed is:

1. An electronic camera, comprising:
an image pickup part for picking up an image of an object and generating image data;
a microprocessor for controlling a system;
a digital signal processor for performing a software signal processing on the image data; and a multi-port memory having a first port and a second port through which data can be independently accessed, wherein:

the microprocessor writes the image data generated by the image pickup part to the multi-port memory through the first port;

the digital signal processor reads the image data from the second port of the multi-port memory to perform the software signal processing on the image data, and writes the processed data to the multi-port memory through the second port;

the microprocessor reads, from the first port of the multi-port memory, the image data on which the software signal processing has been performed, and records the read image data on a recording medium for storing data, and in accordance with a progress in the software signal processing of the digital signal processor, the microprocessor controls data access to the multi-port memory so as to shorten a waiting time for the software signal processing.

2. An electronic camera, comprising:

an image pickup part for picking up an image of an object and generating image data;

a microprocessor for controlling a system;

a digital signal processor for performing a software signal processing on the image data;

a multi-port memory having a first port and a second port through which data can be independently accessed; and a signal processing engine for performing, with hardware, a signal processing on the image data generated by the image pickup part, the signal processing being different from the signal processing performed by the digital signal processor, wherein the microprocessor writes the image data generated by the image pickup part to the multi-port memory through the first port;

the digital signal processor reads the image data from the second port of the multi-port memory to perform the software signal processing on the image data, and writes the processed data to the multi-port memory through the second port;

the microprocessor reads, from the first port of the multi-port memory, the image data on which the software signal processing has been performed, and records the read image data on a recording medium for storing data; and the microprocessor selectively uses one of the signal processing engine and the digital signal processor according to a record format of the image data to process the image data, and records the processed image data on the recording medium.

3. The electronic camera according to claim 2, wherein when the signal processing engine is selectively used for a signal processing on the image data, the digital signal processor performs the software signal processing on a micro image of the image data.

4. The electronic camera according to claim 2, wherein when the signal processing engine is selectively used for the signal processing on the image data, the digital signal processor performs the software signal processing on audio data associated with the image data.

5. A control integrated circuit installed in an electronic camera that picks up an image of an object and generates image data, comprising:

a microprocessor for controlling a system;

a digital signal processor for performing a software signal processing on the image data; and a multi-port memory having a first port and a second port through which data can be independently accessed, wherein:

the microprocessor writes the image data generated by the image pickup part to the multi-port memory through the first port;

the digital signal processor reads the image data from the second port of the multi-port memory to perform the software signal processing on the image data, and writes the processed data to the multi-port memory through the second port;

the microprocessor reads, from the first port of the multi-port memory, the image data on which the software signal processing has been performed, and records the read image data on a recording medium for storing data, and in accordance with a progress in the software signal processing of the digital signal processor, the microprocessor controls data access to the multi-port memory so as to shorten a waiting time for the software signal processing.

6. A control integrated circuit installed in an electronic camera that picks up an image of an object and generates image data, comprising:

a microprocessor for controlling a system;

a digital signal processor for performing a software signal processing on the image data;

a multi-port memory having a first port and a second port through which data can be independently accessed; and a signal processing engine for performing a signal processing on the image data with hardware, the signal processing being different from the signal processing performed by the digital signal processor, wherein the microprocessor writes the image data generated by the image pickup part to the multi-port memory through the first port;

the digital signal processor reads the image data from the second port of the multi-port memory to perform the software signal processing on the image data, and writes the processed data to the multi-port memory through the second port;

the microprocessor reads, from the first port of the multi-port memory, the image data on which the software signal processing has been performed, and records the read image data on a recording medium for storing data; and the microprocessor selectively uses one of the signal processing engine and the digital signal processor according to a record format of the image data to process the image data, and records the processed image data on the recording medium.

7. The control integrated circuit according to claim 6, wherein when the signal processing engine is selectively used for a signal processing on the image data, the digital signal processor performs the software signal processing on a micro image of the image data.

8. The control integrated circuit according to claim 6, wherein when the signal processing engine is selectively used for the signal processing on the image data, the digital signal processor performs the software signal processing on audio data associated with the image data.

9. An electronic camera, comprising:
an image pickup part for picking up an image of an object and generating image data;
a microprocessor for controlling a system;
a digital signal processor for performing a software signal processing on the image data; and
a multi-port memory having a first port and a second port through which data can be independently accessed, wherein:
the microprocessor writes the image data generated by the image pickup part to the multi-port memory through the first port;
the digital signal processor reads the image data from the second port of the multi-port memory to perform the software signal processing on the image data, and writes the processed data to the multi-port memory through the second port;
the microprocessor reads, from the first port of the multi-port memory, the image data on which the software signal processing has been performed, and records the read image data on a recording medium for storing data,
said software signal processing is an image compression; and
said digital signal processor prevents the multi-port memory from overflowing, by reading out the image data in the multi-port memory, reducing a size of data by performing the image compression to the image data, and re-writing the image data, having the size of data reduced, to the multi-port memory.

10. A control integrated circuit installed in an electronic camera that picks un an image of an object and generates image data, comprising:
a microprocessor for controlling a system;
a digital signal processor for performing a software signal processing on the image data; and
a multi-port memory having a first port and a second port through which data can be independently accessed, wherein:
the microprocessor writes the image data generated by the image pickup part to the multi-port memory through the first port;
the digital signal processor reads the image data from the second port of the multi-port memory to perform the software signal processing on the image data, and writes the processed data to the multi-port memory through the second port;
the microprocessor reads, from the first port of the multi-port memory, the image data on which the software signal processing has been performed, and records the read image data on a recording medium for storing data,
said software signal processing is an image compression; and
said digital signal processor prevents the multi-port memory from overflowing, by reading out the image data in the multi-port memory, reducing a size of data by performing the image compression to the image data, and re-writing the image data, having the size of data reduced, to the multi-port memory.

* * * * *